Figure 5:
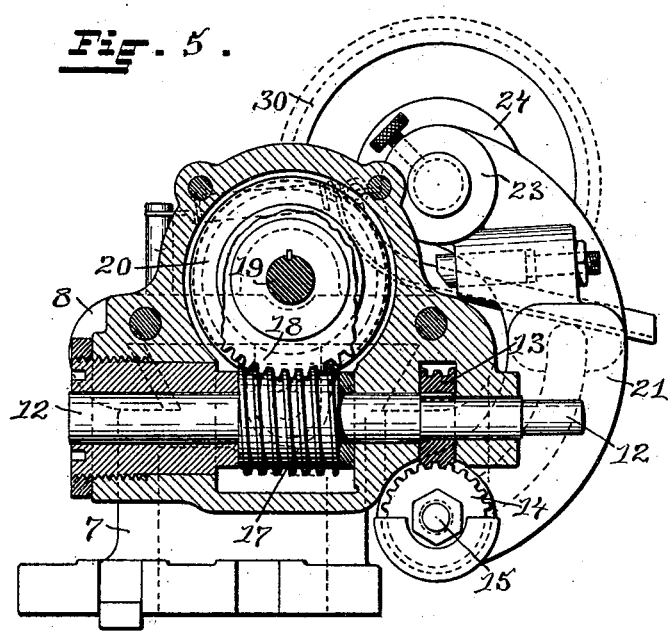

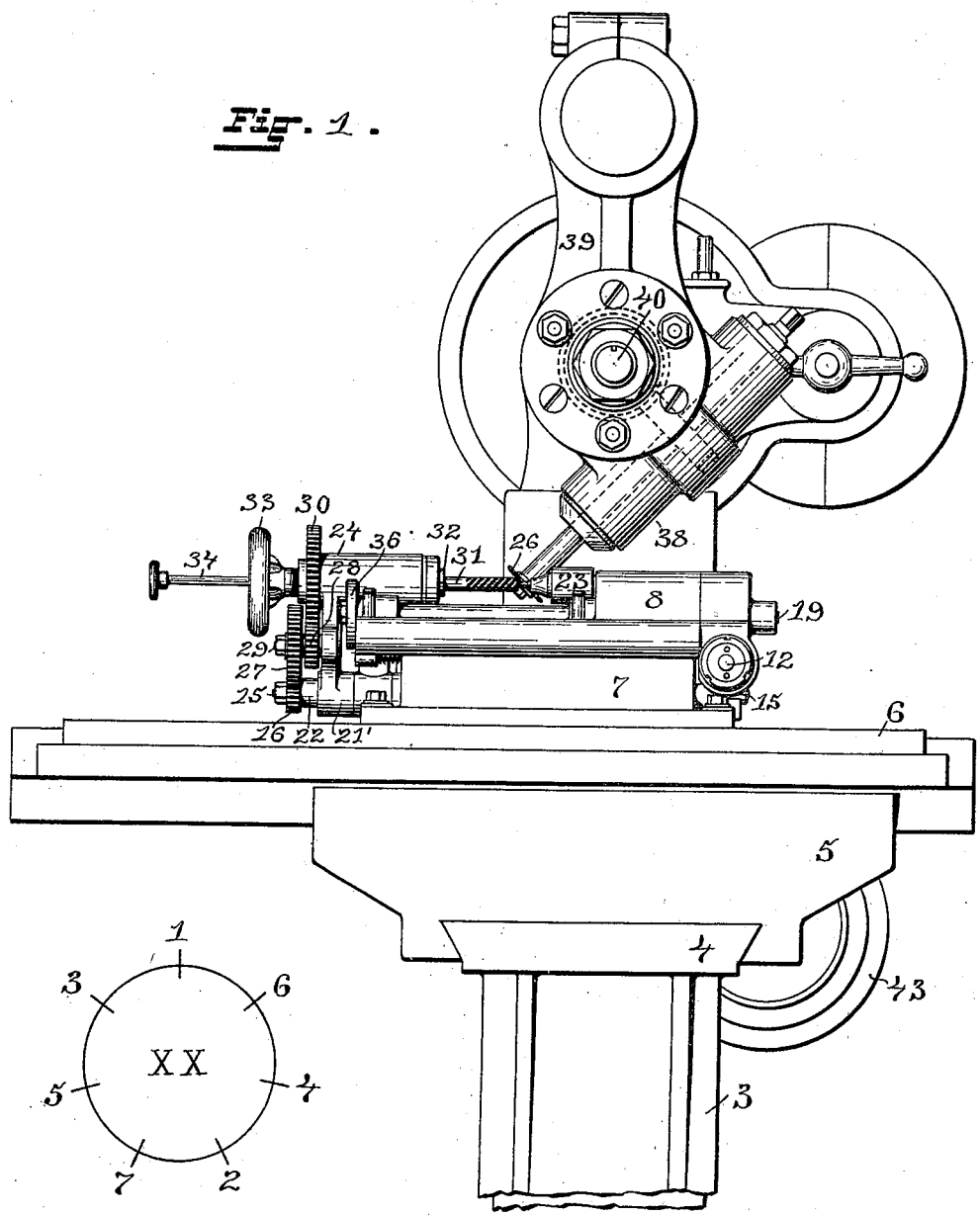

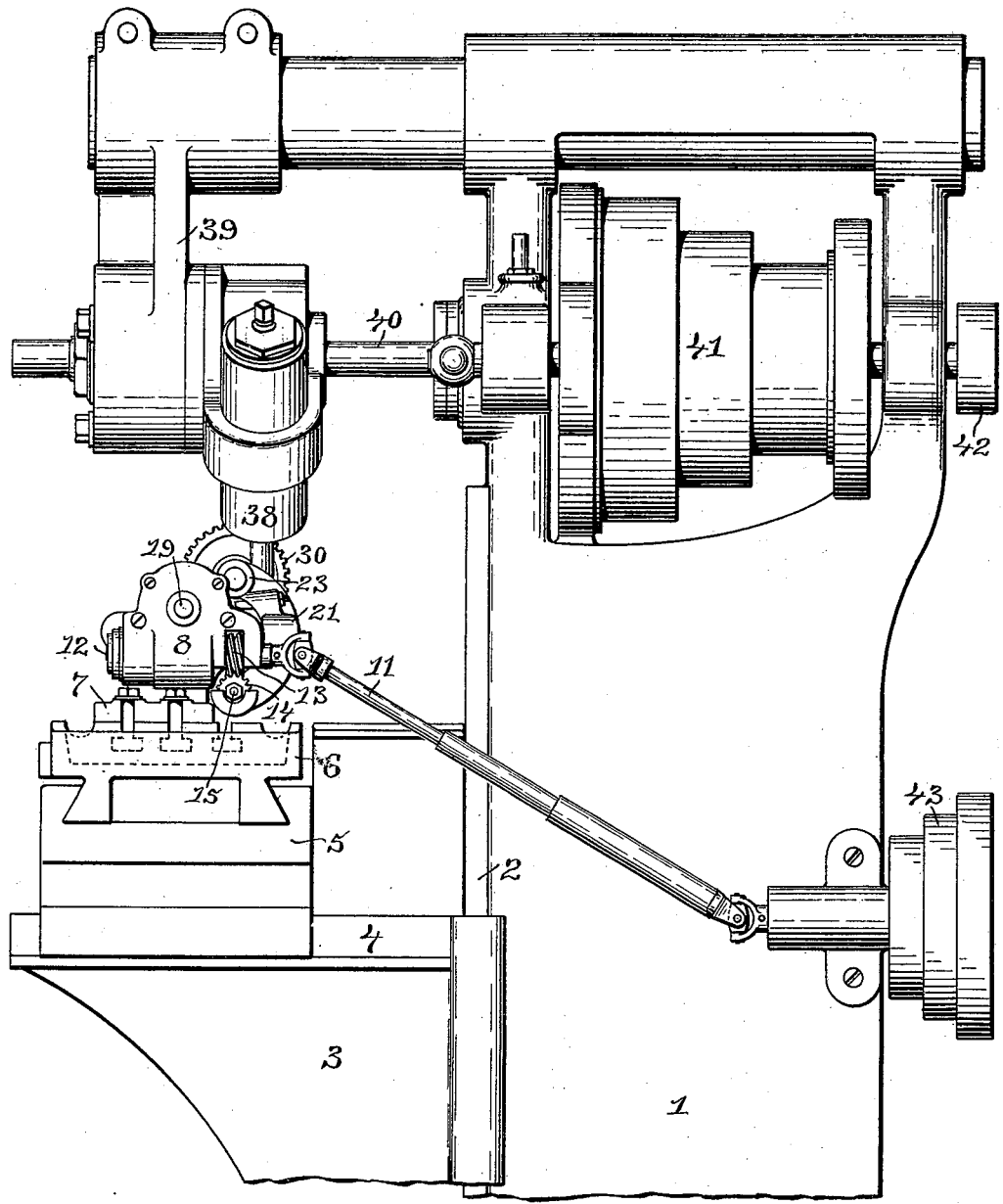

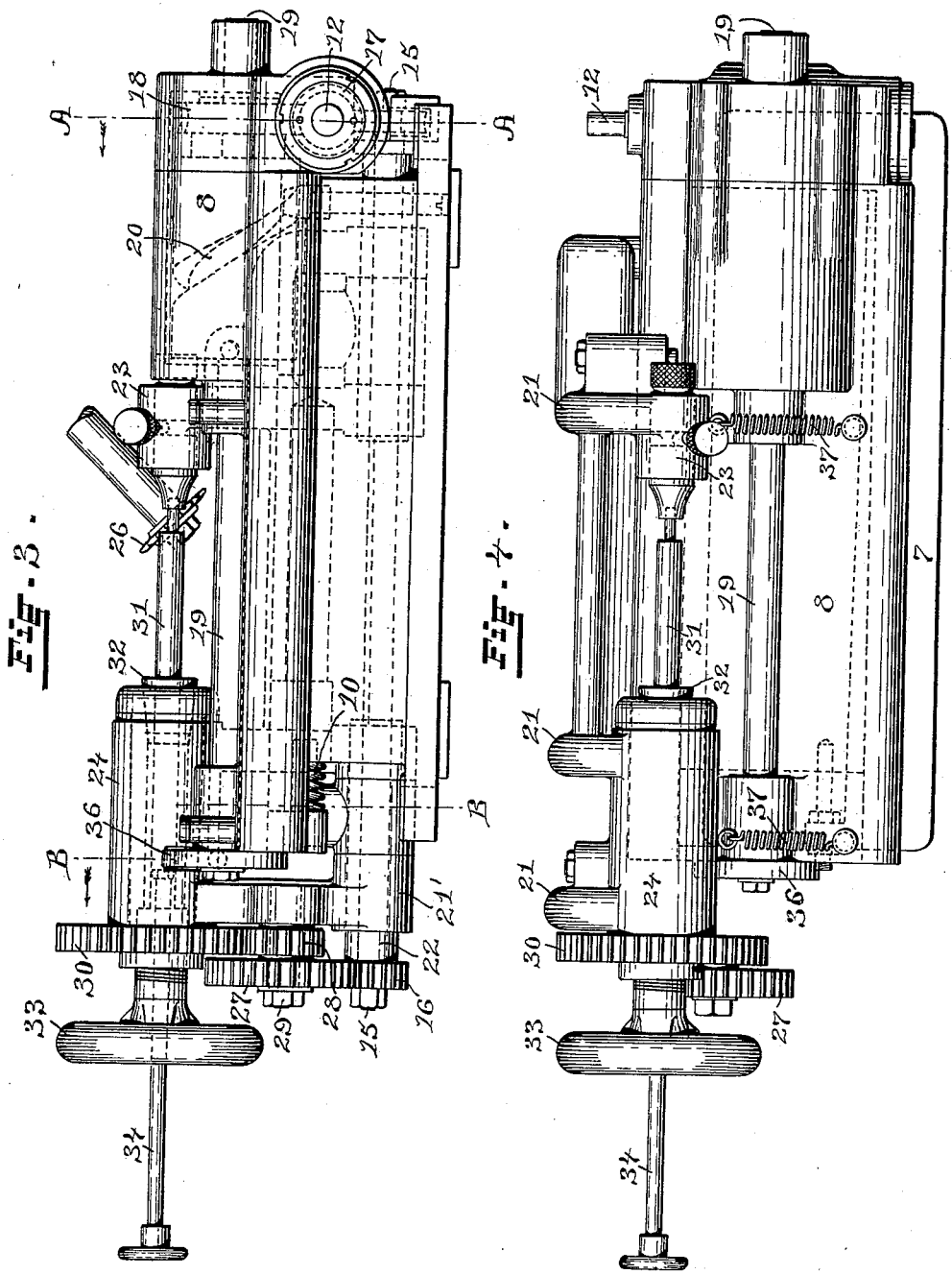

No. 621,519. Patented Mar. 21, 1899.
W. G. BURNHAM.
GEAR CUTTING MACHINE.
(Application filed Feb. 10, 1898.)
(No Model.) 5 Sheets—Sheet 4.

WITNESSES: B. M. Simms, Chas. H. Luther Jr.

INVENTOR: William G. Burnham by Joseph A. Miller & Co. Attys.

No. 621,519. Patented Mar. 21, 1899.
W. G. BURNHAM.
GEAR CUTTING MACHINE.
(Application filed Feb. 10, 1898.)
(No Model.) 5 Sheets—Sheet 5.
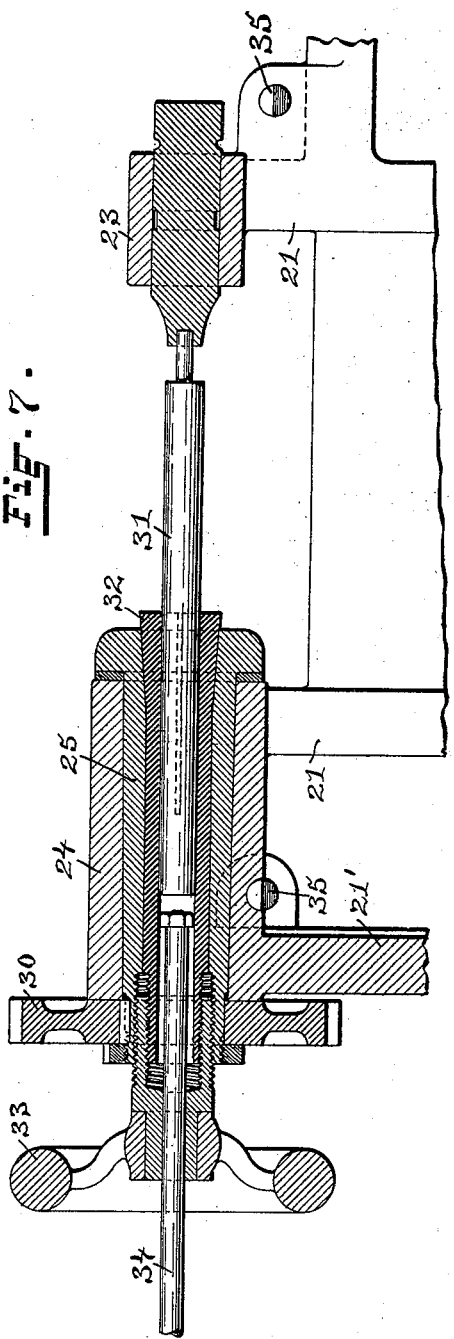
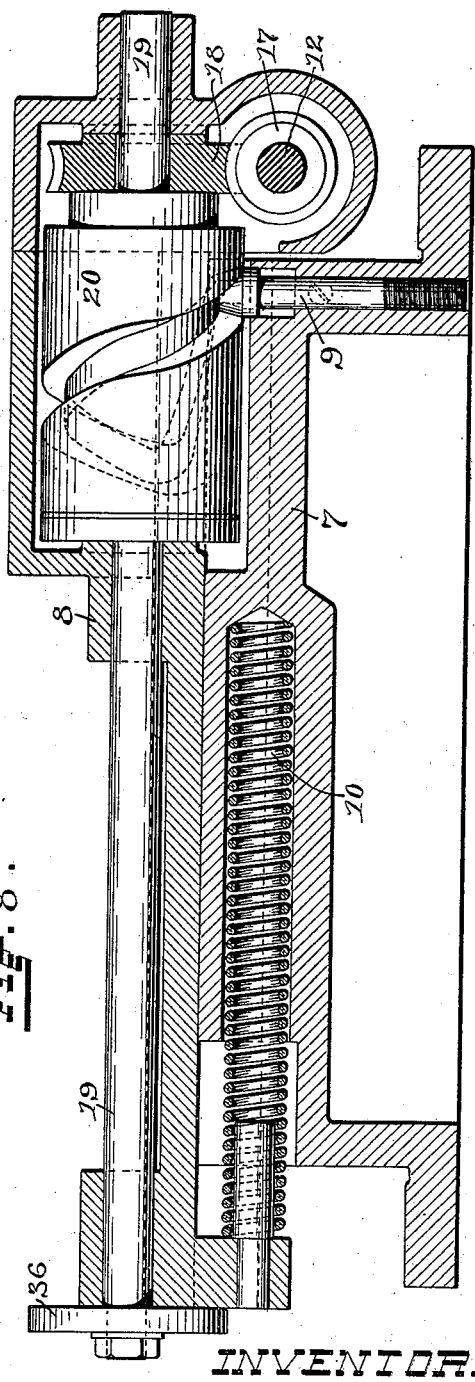
WITNESSES:
B. M. Simms
Chas. H. Luther Jr.
INVENTOR:
William G. Burnham
by Joseph A. Miller & Co.
Attys.

UNITED STATES PATENT OFFICE.

WILLIAM G. BURNHAM, OF PROVIDENCE, RHODE ISLAND, ASSIGNOR TO THE BROWN & SHARPE MANUFACTURING COMPANY, OF SAME PLACE.

GEAR-CUTTING MACHINE.

SPECIFICATION forming part of Letters Patent No. 621,519, dated March 21, 1899.

Application filed February 10, 1898. Serial No. 669,791. (No model.)

*To all whom it may concern:*

Be it known that I, WILLIAM G. BURNHAM, of Providence, in the county of Providence and State of Rhode Island, have invented new and useful Improvements in Gear-Cutting Machines; and I hereby declare that the following is a full, clear, and exact description of the same, reference being had to the accompanying drawings, forming part of this specification.

This invention has reference to improvements in machines for cutting the teeth of gears; and it consists in the peculiar and novel construction, the arrangement of the work-supporting carriage, and the operative mechanism by which the work is automatically indexed and presented to the cutters, as will be more fully set forth hereinafter.

In cutting gears the blank, wheel, or disk out of which the gear is to be formed by cutting grooves of the required cross-section has to be cut on the periphery to separate the teeth. These must be accurately spaced to form a perfect gear.

In practice usually a number of blanks, wheels, or disks are secured to a mandrel and cut simultaneously.

When the teeth of the gears are required to extend obliquely across the periphery of the wheels, a number of the wheels, blanks, or disks are secured to a mandrel, and the grooves are cut spirally on the series of blanks. A rotary movement, as well as a forward movement, is given to the series of blanks, which for the purpose of this specification is called the "work," and when one spiral groove has been cut the cutter is moved away from the work and carried back to the end of the work and then again moved toward the work and rotated to cut the next spiral groove.

It has heretofore been difficult to accurately index the work, so as to secure the exact cutting of the series of spiral grooves to form accurately perfect spiral gears. The indexing also required time and great care. One serious obstacle to the accurate indexing was the stopping of the movement of the series of gears required to operate the carriage and the work.

One object of this invention is to automatically index the work and cut the series of spiral grooves automatically into the work to complete the series of wheels.

Another object of the invention is to maintain a constant speed in the gears operating the carriage and the work during the operation of cutting the set of gears, so as to prevent all possible change or backlash and secure the accurate cutting of the gears. To this end the gears are arranged to move continually during the cutting of one set of gears and during the backward movement of the work to turn the work a distance equal to two or more teeth, as will be more fully described hereinafter.

Figure 6:
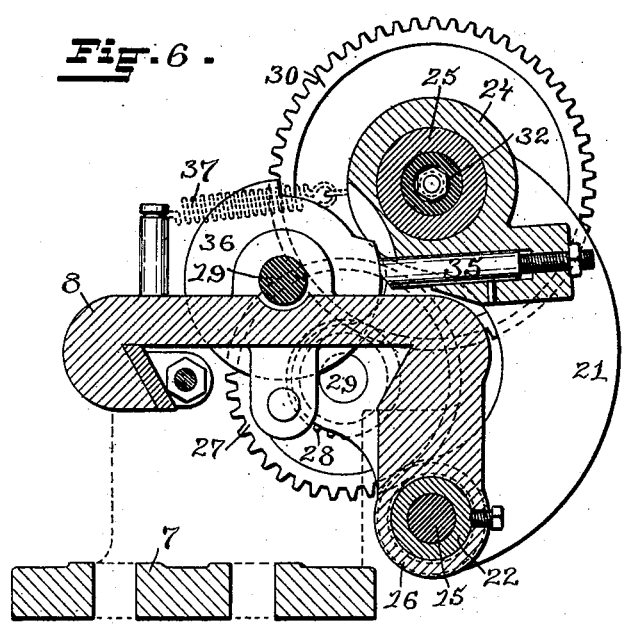

Figure 1 is a front elevation of the machine for cutting spiral gears embodying the invention. The base of the supporting-column is broken off to reduce the size of the drawing. The diagram marked X X annexed to Fig. 1 indicates the method of automatically indexing the gears. Fig. 2 is an end view of the machine. Fig. 3 is a front view of the work-supporting carriage. Fig. 4 is a plan view of the same. Fig. 5 is a transverse sectional view of the work-carriage on the line A A of Fig. 3, showing the worms and the worm-gears by which power is transmitted to the work-operating and the carriage-reciprocating mechanism. Fig. 6 is a transverse sectional view of the work-supporting carriage on the line B B of Fig. 3, showing the cam by which the work is held against the cutter to cut a spiral groove. Fig. 7 is a longitudinal sectional view of the work-holder, showing the clamp for holding the work or the mandrel on which the work is supported. Fig. 8 is a longitudinal sectional view of part of the carriage, showing the cam for imparting reciprocating motion to the same.

Similar numerals of reference indicate corresponding parts in all the figures.

In the drawings the machine illustrated is organized to cut small spiral gears with seven teeth automatically. The gearing by which the work is rotated and the spiral cam by which the work is reciprocated coact, so that after the cutting of one spiral groove is completed during the backward movement of the work the work is rotated so that the next spiral groove to be cut will be the third from the previously-cut groove, as is shown on the diagram X X, in which the consecutive grooves cut are indicated by the successive numerals 1 2 3, &c.—that is to say, after the first spiral groove is cut the work, which is continuously rotated, is turned so as to skip two spaces between the cutting of two successive spiral grooves. As shown in the diagram, groove 1 is first cut. Then two spaces are skipped and groove 2 is cut. Two spaces bring the next groove at 3. Skipping now groove 1 and another space, groove 4 is cut. Skipping groove 2 and another space, groove 5 is cut. Skipping now grooves 3 and 1, groove 6 is cut. Skipping grooves 4 and 2, groove 7 is cut to complete the gears. The gears turning the work to secure the spiral cutting of the grooves to form the teeth continue to run to index the grooves automatically, and this arrangement may be in connection with the longitudinal reciprocation of the work and can be applied to the cutting of other spiral gears. Thus gears with eight teeth can be automatically indexed and cut by skipping two spaces, gears with nine teeth by skipping one space, gears with ten teeth by skipping two spaces, with twelve teeth by skipping four spaces, and gears with sixteen teeth by the skipping of two spaces. Having ascertained the number of spaces required to be skipped to register automatically the cutting of the desired number of teeth, the spiral cam by which the longitudinal movement of the work is controlled is formed so as to return the work to the point of beginning the grooves within the time required to turn the work two or more spaces.

In the drawings, 1 indicates the supporting-column of the machine; 2, vertical ways on the supporting-column; 3, a bracketed table secured to the column adapted to slide vertically on the ways 2 and provided with the horizontal slide 4, on which the bed 5 is supported; 6, a table. On this table the bed 7 is secured by T-bolts, as is shown in Fig. 2, and this bed 7 forms the support of the carriage 8, on which the work and all the mechanism for operating the carriage and the work are carried. The bed 7 has secured to it the pin 9 and the coiled spring 10. (Shown on an enlarged scale in Fig. 8.) The automatically-adjustable shaft 11 transmits motion to the worm-shaft 12. (Shown enlarged in Fig. 5.) The worm 13 drives the worm-wheel 14 on the shaft 15, which extends lengthwise through the carriage 8 and carries on its opposite end the pinion 16. The worm 17 engages with the worm-wheel 18 on the shaft 19, on which the spiral cam 20 is secured. The shaft 19 is journaled in the carriage 8, the parts being accurately fitted to secure substantial end thrusts and avoid any longitudinal motion of the shaft and cam. As shown in Fig. 8, the cam-groove engages with the pin 9. The rotation of the cam 20 moves the carriage 8 against the coiled spring 10 to compress the same until the pin 9 reaches the end of the spiral portion of the groove. When the pin enters the portion of the groove connecting the opposite ends of the spiral, the coiled spring acts to force the carriage in the opposite direction controlled by the turning of the cam. The spiral spring bearing continually on the bed and the carriage maintains the contact of the pin 9 with the cam 20 and prevents backlash.

The carriage consists of two parts. The part 8, supported on the bed 7 and operated by the cam 20, is shown in section in Fig. 6 and supports the shaft 15. The work-supporting part of the carriage and the gears for rotating the work are carried on the arms 21 21, which are pivotally supported on the tubular sleeves 22 22, inclosing the shaft 15. The foot-stock 23 and the bearing 24 of the arbor 25 (shown in Fig. 7) are supported by the arms 21 21, and the work may be swung toward or away from the cutter.

The pinion 16 engages with the gear 27, supported on the stud 29, extending from the arm 21'. The gear 27 rotates with the pinion 28, the two being secured to a sleeve supported on the stud 29. The pinion 28 engages with the gear 30, secured to the arbor 25, to rotate the work secured in or to the arbor. The work into which spiral grooves are to be cut or the mandrel 31, on which the wheels, blanks, or disks are supported, is secured in the arbor by means of the clamping-tube 32, having one end split and drawn into the conical socket of the arbor 25 by a tubular sleeve operated by the hand-wheel 33 and having screw-thread engagement with the tube 32 and, as shown in the drawings, Fig. 7, with the arbor, but of different pitch. The rod 34 is used to push the mandrel out of the clamping-tube when released.

The swinging part of the carriage, supported on the arms 21 21, is provided with the adjustable stop 35, which is held against the cam 36 by the spiral springs 37 37, secured at opposite ends to the fixed and the swinging parts of the carriage. The cam 36 is formed to hold the work against the cutter during part of its revolution and allow the springs 37 37 to draw the work away from the cutter during a part of its revolution. As shown in Fig. 6, the cam is holding the work against the cutter. The cut-away part of the cam 36 operates to allow the work to swing away from the cutter, while the work and the carriage are moved back to commence the cutting of the next spiral groove. While the cutter 26 and mechanism for operating the same are essential to the operation of the machine, they form no part of the invention. The shaft supporting the cutter 26 is journaled in the casing 38, which is adjustably secured to the bracket 39, so that the shaft and cutter may be swung and held in any desired position. The shaft 40 transmits motion to the cutter by suitable gearing and is driven by a belt connected with the cone-pulley 41. The pulley 42, secured to the shaft 40, is connected by a belt (not shown) with the cone-pulley 43, and the telescopic shaft 11, connected by means of universal couplings, connects the shaft of the cone-pulley with the worm-shaft 12, and thereby transmits motion to the spiral groove or gear-cutting machine.

When the so-organized machine is properly secured on the table 6 and the cutter adjusted to the work, the starting of the driving-belt will operate the worms and gears continuously, reciprocating and rotating the work until all the spiral grooves are cut into the work or obliquely across the periphery of the series of wheels, blanks, or disks.

Having thus described my invention, I claim as new and desire to secure by Letters Patent—

1. In a gear-cutting machine, the combination of the following instrumentalities: a rotating cutter, a bed, a carriage supported on the bed, a work-support pivotally secured to the carriage, and mechanism, substantially as described, for reciprocating the carriage, rotating the work, and holding the work against the cutter at predeterminate intervals; whereby a groove is cut at the forward movement of the work in contact with the cutter, and the work is moved away from the cutter and rotated as the carriage is moved backward, as described.

2. In a gear-cutting machine, the combination, with the rotary cutter of a milling-machine, of a bed adapted to be secured to the usual table of a milling-machine, a carriage supported on the bed, a worm-shaft provided with two worms, a shaft provided with a worm-gear, a cam operated to reciprocate the carriage, and a cam controlling the position of the work, a power-transmitting shaft having a worm-gear at one end and a pinion on the other end, a work-support pivotally supported on the power-transmitting shaft, a rotating arbor to which the work is secured, a gear on the arbor, gears carried on the pivoted work-support, and operative mechanism connected with the worm-shaft; whereby a series of spiral grooves are cut and automatically registered, as described.

3. A work-supporting carriage for gear-cutting machines consisting of a bed, a carriage sliding on ways on the bed, a work-supporting frame pivotally supported on the carriage, a cam controlling the position of the work-supporting frame, mechanism for reciprocating the carriage, and mechanism, substantially as described, for rotating the work continuously, the parts being coördinated to cut a series of equidistant grooves automatically without stopping the machine or indexing the same, as described.

4. In a screw-cutting machine, the combination with the rotary cutter of a milling-machine, and the work-supporting table, of the bed 7 provided with ways, the pin 9, the coiled spring 10, the carriage 8, the swinging work-support pivotally connected with the carriage, the worm-shaft 12, the worms 13 and 17 on the worm-shaft, the worm-wheel 18, the cam 20, and the cam 36 on the shaft 19, the worm-wheel 14 at one end and the pinion 16 at the other end of the shaft 15, the gear 30 on the arbor 25, the intermediate gears 27 and 28, the springs 37 37, the adjustable stop 35, and mechanism connecting the driving mechanism of the milling-machine with the worm-shaft 12; whereby the work is presented to the milling-cutter, and spiral gears may be automatically cut, as desired.

5. In a gear-cutting machine, the combination of the following instrumentalities: a rotating cutter, a reciprocating carriage, a work-support connected with the carriage and composed in part of a rotatable arbor, a gear on the rotatable arbor, mechanism, substantially as described, for reciprocating the carriage, and mechanism for rotating the work; whereby, during the backward movement of the work, the same is turned two or more spaces and automatically indexed to cut the grooves in forming the teeth of gears by skipping two or more spaces, or teeth, as described.

In witness whereof I have hereunto set my hand.

WILLIAM G. BURNHAM.

Witnesses:
JOSEPH A. MILLER, Jr.,
B. M. SIMMS.